United States Patent
Andersson et al.

(10) Patent No.: US 8,195,945 B2
(45) Date of Patent: Jun. 5, 2012

(54) SECURE DIGITAL CERTIFICATE STORING SCHEME FOR FLASH MEMORY AND ELECTRONIC APPARATUS

(75) Inventors: Stefan Andersson, Klågerup (SE); Werner Johansson, Arlöv (SE); Stefan Lindgren, Malmö (SE)

(73) Assignee: Sony Mobile Communications AB, Lund (SE)

( * ) Notice: Subject to any disclaimer, the term of this patent is extended or adjusted under 35 U.S.C. 154(b) by 1017 days.

(21) Appl. No.: 11/164,673

(22) Filed: Dec. 1, 2005

(65) Prior Publication Data
US 2007/0130439 A1     Jun. 7, 2007

(51) Int. Cl.
*G06F 21/00* (2006.01)
(52) U.S. Cl. ........................................ 713/175
(58) Field of Classification Search .................. 711/200; 713/175
See application file for complete search history.

(56) References Cited

U.S. PATENT DOCUMENTS

| | | | |
|---|---|---|---|
| 5,533,123 A * | 7/1996 | Force et al. | 713/189 |
| 5,651,068 A * | 7/1997 | Klemba et al. | 713/159 |
| 6,094,724 A * | 7/2000 | Benhammou et al. | 726/20 |
| 6,175,523 B1 * | 1/2001 | Yang et al. | 365/185.25 |
| 6,249,872 B1 * | 6/2001 | Wildgrube et al. | 726/2 |
| 6,324,645 B1 * | 11/2001 | Andrews et al. | 713/157 |
| 6,598,165 B1 * | 7/2003 | Galasso | 713/189 |
| 6,823,454 B1 * | 11/2004 | Hind et al. | 713/168 |
| 6,826,690 B1 * | 11/2004 | Hind et al. | 713/186 |
| 7,185,145 B2 * | 2/2007 | Mizushima et al. | 711/115 |
| 7,350,023 B2 * | 3/2008 | Mizushima et al. | 711/115 |
| 7,650,503 B2 * | 1/2010 | Mizushima et al. | 713/172 |
| 7,681,046 B1 * | 3/2010 | Morgan et al. | 713/193 |
| 7,694,067 B2 * | 4/2010 | Mizushima et al. | 711/103 |
| 7,873,830 B2 * | 1/2011 | Fayad et al. | 713/169 |

(Continued)

FOREIGN PATENT DOCUMENTS

EP     1139210 A1     10/2001

(Continued)

OTHER PUBLICATIONS

"Configuring Cisco IOS Certificate Enrollment Using Enhanced Enrollment". 2003. Available at http://web.archive.org/web/20031216070525/www.cisco.com/warp/public/707/ios_enhanced_enrollment.pdf. Downloaded Jun. 10, 2010.*

(Continued)

*Primary Examiner* — David García Cervetti
(74) *Attorney, Agent, or Firm* — Renner, Otto, Boisselle & Sklar, LLP (57) ABSTRACT

A method for storing and updating digital certificates in a flash memory, a flash memory, and an electronic apparatus exploiting the method are disclosed. The method is applicable for a flash memory having predefined erase-write blocks and write-read blocks, for enhancing the tampering proof characteristics of the flash memory. The certificates may be used to authenticate a computer program and may be verified by a verification program associated with the computer program. The method may include defining a plurality of memory slots within at least one erased erase-write block wherein each memory slot have a commencing address comprising a binary "0"- or a binary "1" bit pattern, writing a first and second digital certificate in a first and second one of the memory slots, defining a certificate slot address pointer, and updating the certificate slot address pointer by replacing said "0"- or "1"-bit pattern of the pointer with a "1"- or a "0" bit pattern, respectively.

23 Claims, 5 Drawing Sheets

U.S. PATENT DOCUMENTS

| | | | |
|---|---|---|---|
| 2002/0199096 A1* | 12/2002 | Wenocur et al. | 713/153 |
| 2003/0009694 A1* | 1/2003 | Wenocur et al. | 713/201 |
| 2003/0041110 A1* | 2/2003 | Wenocur et al. | 709/206 |
| 2003/0066894 A1 | 4/2003 | Boyer et al. | 235/492 |
| 2004/0059916 A1* | 3/2004 | Mizushima et al. | 713/172 |
| 2004/0128503 A1* | 7/2004 | Watanabe et al. | 713/157 |
| 2004/0177215 A1* | 9/2004 | Nagamasa et al. | 711/103 |
| 2004/0255113 A1* | 12/2004 | Ogura | 713/156 |
| 2005/0055496 A1* | 3/2005 | Nallapa | 711/103 |
| 2005/0159134 A1* | 7/2005 | Suzuki | 455/410 |
| 2007/0030974 A1* | 2/2007 | Ishibashi et al. | 380/281 |
| 2007/0088906 A1* | 4/2007 | Mizushima et al. | 711/103 |
| 2007/0130439 A1* | 6/2007 | Andersson et al. | 711/200 |
| 2008/0082825 A1* | 4/2008 | Mizushima et al. | 713/172 |
| 2008/0307229 A1* | 12/2008 | Andersson et al. | 713/176 |

FOREIGN PATENT DOCUMENTS

| | | |
|---|---|---|
| EP | 1429224 | 6/2004 |
| WO | 00/72149 A | 11/2000 |

OTHER PUBLICATIONS

Office Action from corresponding European Patent Application No. 06819213.7.

* cited by examiner

SECURE DIGITAL CERTIFICATE STORING SCHEME FOR FLASH MEMORY AND ELECTRONIC APPARATUS

TECHNICAL FIELD OF THE INVENTION

The invention relates generally to data security and to data memory technologies, and more specifically to a method for storing and updating/finding digital certificates in a flash memory, and a flash memory and an electronic apparatus exploiting said method.

DESCRIPTION OF RELATED ART

Data security schemes based on public-private key crypto methods normally exploit digital certificates for verifying the validity of a subject's public key. Examples of digital certificate are PGP-certificates and certificates conforming to the X.509 security standard. A digital certificate normally consists of three things: A public key, certificate information ("Identity" information about the subject, such as name, user ID, and so on.), and one or more digital signatures. Generally speaking, the older a key or certificate is the higher is the risk that the key/certificate has been tampered with by an attacker. Therefore, all crypto-systems normally update the keys, and the digital certificates associated therewith, at regular intervals or as soon as a fraud/attack has been detected.

Digital certificates are for instance used in various electronic apparatuses, e.g. mobile stations, such as mobile telephones, for providing a secure booting of the device. The digital certificates, along with a booting program and a verification program, are then normally stored in a ROM and verified by the verification program during booting. It is a problem that the ROM memories are inflexible, e.g. in relation to flash memories, since a ROM can not be rewritten, making it expensive to update e.g. the booting program since the entire ROM must be replaced. Furthermore, ROM-memories as such are rather expensive in relation to e.g. flash memories, however, flash memories have not been able to substitute ROM memories in mobile stations because of security problems associated with flash memories.

In case a ROM is coupled with a flash memory having a stored program this program may be verified by certificates stored in the flash as well. Updating the certificates in the flash constitutes a security problem because the flash memory is exposed to security attacks during the erasing/writing of erase-write block/s of the flash. There is thus a need to find methods and means enhancing the tampering proof characteristics of flash memories and making flash memories more secure.

There is further a general need to find methods and means allowing cost efficient memory utilization in electronic devices.

SUMMARY OF THE INVENTION

It is an object of the present invention to enhance the tampering proof characteristics of a flash memory, i.e. increasing the data security of the flash.

It is a further object of the present invention to provide efficient memory utilization in electronic devices.

It is a further object of the present invention to decrease the cost of production of electronic equipment, such as a portable radio communication equipment, e.g. a mobile station, a pager, a communicator, a smartphone, a PDA, a mobile telephone etc, here referred to as a mobile radio terminal.

Still a further object of the invention is to provide effective and efficient means and methods for increasing the flexibility of such electronic equipment regarding software update.

The invention mainly achieves the above objects by providing a method for how to write/update/read digital certificates into/in/from a flash memory, to be used by electronic equipment such as a mobile radio terminal. According to the invention, the certificates do not need to be erased in the flash memory, preferably they are never erased, and certificate update is simply performed by means of a certificate slot address pointer update, thus decreasing the period of time during which a flash memory is exposed to security attacks during certificate update. This means that the tampering proof characteristics of the flash is improved allowing the substitution of ROM-memories with flash-memories for a wide range of electronic equipment, such as for mobile radio terminals. Thus, many conventional ROMs, particularly BIOS ROMs, can be replaced by flash memories exploiting the method according to the invention without compromising data security in any significant way, thus making electronic equipment more flexible regarding software update, particularly regarding booting program updates, and less costly to produce/use.

According to a first aspect, the invention provides a method for writing and updating digital certificates in a flash memory having predefined erase-write blocks and write-read blocks, for enhancing the tampering proof characteristics of said flash memory, said certificates authenticating a computer program and being verified by a verification program associated with the computer program, said method comprising the steps of:
  erasing at least one of said erase-write blocks,
  defining a plurality of memory slots within said at least one erased erase-write block wherein each memory slot have a commencing address comprising a binary "0"- or a binary "1" bit pattern,
  writing a first digital certificate in a first one of said memory slots and writing a second digital certificate in a second one of said memory slots,
  defining a certificate slot address pointer as being the commencing address of said first memory slot; said slot address pointer to be used by the verification program to fetch the current valid certificate;
  updating said certificate slot address pointer by replacing said "0"- or "1"-bit pattern of said pointer with a "1"- or a "0" bit pattern, respectively, causing the address pointer to point on the commencing address of said second memory slot.

In one embodiment, said method further comprises the steps of:
  writing said certificate slot address pointer in a dedicated slot in said flash memory, and,
  updating the certificate slot address pointer by replacing a "1"-bit pattern of the address pointer with a "0"-bit pattern.

In one embodiment, said at least one of said erase-write blocks is the block which is first addressed when the flash is being powered on.

In one embodiment, said computer program is a booting program booting up a processing means being coupled with said flash memory, when said flash and processing means are powered on, the method further comprising the step of:
  storing the booting program in the block which is first addressed when the flash is being powered on.

In one embodiment, the booting program comprises said verification program and said verification program is stored at the address which is first addressed when the flash is powered on.

In one embodiment, said verification program comprises code means for updating said certificate slot address pointer and comprises write locking code means locking said flash from being written, said method further comprising the step of:

storing said write locking code means in said flash so that the flash is being locked from being written immediately after said certificate slot address pointer is being updated.

In one embodiment, said flash is an MLC flash wherein the step of updating the certificate slot address pointer comprises the step of:

replacing a "11"-bit pattern of the address pointer with a "00"-bit pattern.

In one embodiment, said second digital certificate represents an updated version of said first digital certificate and, at a certain time, replaces said first digital certificate or an updated version of the first certificate.

In one embodiment, said certificates are preinstalled and the step of updating the certificate slot address pointer is carried out periodically by said verification program or by said verification program in response to a lapsed validity time limit as indicated by the first certificate, or as indicated by an updated version of the first certificate.

In one embodiment, the step of updating the certificate slot address pointer comprises the step of:

defining a block address pointer pointing to the end address of said at least one erased erase-write block in which said certificates are being written, searching through said erase-write block for erased and non written slots comprising only "1"-bits, or for completely written slots only comprising "0"-bits, by means of a sequential address search initiating at an address indicated by said block address pointer, identifying the slot of a current valid certificate as being the slot immediately preceding an erased and non written slot being found first during said search, or as being the first found slot during said search which slot does not comprise only "0"-bits, and, updating said certificate slot address pointer with the commencing slot address of said identified slot of the current valid certificate.

In one embodiment, said flash is a NAND flash having pages with a size of 2×256 bytes, the method further comprising the following step:

defining each memory slot as being one page or a set of pages.

According to a second aspect, the invention provides a flash memory having predefined erase-write blocks and write-read blocks and having stored at least a first and second digital certificate which may authenticate a computer program and which certificates may be verified by a verification program and wherein said second digital certificate represents an updated version of said first digital certificate, wherein said certificates are being stored in a respective memory slot being defined within an erase-write block, and that a certificate slot address pointer is being stored in the flash which certificate slot address pointer points on the slot in which the current valid certificate is being stored.

In one embodiment, said certificate slot address pointer is being stored in a dedicated slot in said erase-write block in which said certificates are being stored.

In one embodiment, said memory slots are defined within the erase-write block which is first addressed when the flash is being powered on.

In embodiment, said computer program is a booting program booting up a processing means when coupled with said flash memory and when said flash and processing means are powered on, wherein the booting program is stored in the flash block which is first addressed when the flash is being powered on.

In one embodiment, the booting program comprises said verification program and said verification program is stored at the address which is first addressed when the flash is powered on.

In one embodiment, said verification program comprises code means for updating said certificate slot address pointer by replacing a "1"-bit pattern with a "0"-bit pattern of the certificate slot address pointer or by replacing a "11"-bit pattern with a "00"-bit pattern of the certificate slot address pointer, and further comprises write locking code means locking said flash from being written, wherein said write locking means are being stored in said flash so that, when said verification program is being executed, the flash is being locked from being written immediately after said certificate slot address pointer is being updated.

In one embodiment, said flash is an MLC flash and wherein the certificate slot address pointer comprises a "11"-bit pattern or a "00"-bit pattern.

In one embodiment, wherein said certificates are preinstalled and said verification program comprises code means which, when said verification program is being executed, periodically updates said certificate slot address pointer in response to a lapsed validity time limit as indicated by the first certificate, or as indicated by an updated version of the first certificate.

In one embodiment, the verification program comprises program code means for carrying out the following steps:

defining a block address pointer pointing to the end address of said at least one erased erase-write block in which said certificates are being written, searching through said erase-write block for erased and non written slots comprising only "1"-bits, or for completely written slots only comprising "0"-bits, by means of a sequential address search initiating at an address indicated by said block address pointer, identifying the slot of a current valid certificate as being the slot immediately preceding an erased and non written slot being found first during said search, or as being the first found slot during said search which slot does not comprise only "0"-bits, respectively, and, updating said certificate slot address pointer with the commencing slot address of said identified slot of the current valid certificate.

In one embodiment, said flash is a NAND flash having pages with a size of 2×256 bytes, and wherein each memory slot is defined as being one page or a set of pages.

According to a third aspect, the invention provides an electronic apparatus comprising a processing unit communicatively coupled with a flash memory wherein the flash memory is a flash memory according to the second aspect of the invention.

In one embodiment, said electronic apparatus is a mobile radio terminal.

The indicated order of the method steps described in this specification may vary in many ways as understood by a person skilled in the art, and the invention is therefore not restricted to the described order/s.

Even though the invention has been summarized above, the invention is defined by the accompanying claims 1-23.

It should be emphasized that the term "comprises/comprising" when used in this specification is taken to specify the presence of stated features, integers, steps or components but does not preclude the presence or addition of one or more other features, integers, steps, components or groups thereof.

Terminology

Some fundamental terms relevant for the present invention are explained below.

Flash memory: also referred to as a flash, is a rewritable memory chip that holds its content without power. Flash memories evolved from the EEPROM chip, and its name was coined to express how much faster it could be erased ("in a flash"). There are NAND and NOR flashes. A NAND flash can be rewritten up to a million times, and erasing and writing a NAND flash is faster than a NOR flash. Today, a flash typically has a memory size in the range of 8 MB-1 GB.

Memory cells: also referred to as cells. A cell is the memory size for how much data can be written/stored on a single address (number) of a flash. A conventional cell size is e.g. 1 byte, i.e. 8 bits.

Block: Also referred to as erase-write block. Before writing into a flash, memory cells are erased in blocks having a data size today ranging e.g. from 8 KB to 128 KB for a NAND flash and 64-256 KB for a NOR flash. An erase-write block is erased by setting all bits of the erase-write block to "1". After being erased, a block may be updated (written and re-written) only by setting "1"-bits to "0"-bits. Blocks of so called multi level cell flashes, conventionally referred to as MLC-flashes, are normally updated by setting pairs of "1"-bits to pairs of "0"-bits, i.e. a "11" bit pattern is replaced by a "00" bit pattern, giving advantages known to a person skilled in the art.

Read-write block: a memory area of the flash which may be read in a single fetching step and which may be written or re-written (i.e. updated without having to erase the entire block) in a single step. A read-write block may correspond to an erase-write block, or may be a part of an erase-write block. Today, a NOR flash normally have read-write blocks with a size of 1 byte.

Page: Read-write blocks for a NAND flash are normally sector-sized memory areas of 2×256, i.e. 512, bytes forming so called pages; however other page sizes may be used.

Slot: The Invention defines a slot, also referred to as a memory slot, as being a dedicated memory area within a write block. In case of a NAND flash, a slot may be defined as a set of pages, e.g. as being two pages of 1024 bytes. The invention defines these slots for storing digital certificates etc. in a way allowing a simple updating of the certificates, i.e. for performing certificate roll over, by means of a certificate slot pointer update, as described further below.

Certificate slot address pointer: The invention defines a certificate slot address pointer pointing on the commencing address of the slot in which the current valid certificate is stored in the flash. The certificate slot address pointer is used by a verification program to find the current valid certificate.

BRIEF DESCRIPTION OF THE DRAWINGS

The features and advantages of the present invention will become more apparent from the following detailed description of the preferred embodiments with reference to the accompanying drawings, wherein.

DETAILED DESCRIPTION OF PREFERRED EMBODIMENTS

Now, with reference to FIG. 1-4, the present invention shall be described in more detail.

The invention will here be described in detail for the specific embodiment wherein the electronic equipment is a mobile radio terminal, but it is to be understood that the invention is applicable for any electronic equipment comprising a processing unit, e.g. a CPU, communicatively coupled with a flash memory.

Examples of mobile radio terminals are e.g. a mobile telephone, a pager, a communicator, i.e. electronic organizer, smartphone or the like, a PDA (Personal Digital Assistant), a portable communication apparatus etc.

Figure 1:
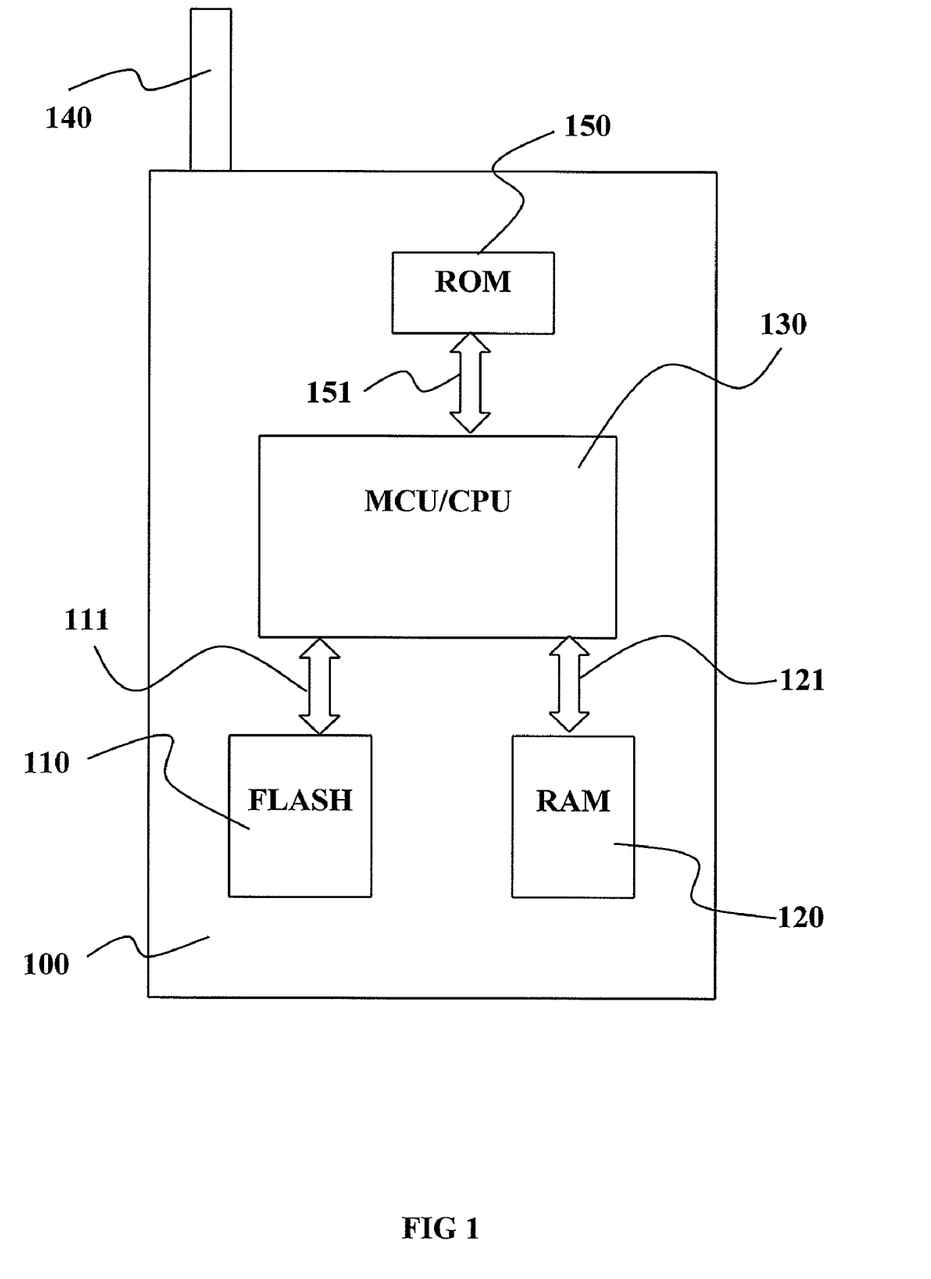
FIG. 1 illustrates some of the main functional blocks of a mobile radio terminal 100 according to the invention.

FIG. 1 illustrates some of the main functional blocks of a mobile radio terminal 100. The mobile terminal 100 comprises a conventional control circuit, 130, such as a micro computer unit, MCU, CPU (Central Processing Unit) or the like, a flash-memory 110 adapted according to the invention as described further below and (optionally) a conventional RAM-memory 120. The terminal 100 has a conventional antenna 140 for establishing a radio link communication with a cellular radio network. The antenna 140 is interconnected with conventional transceiver means (not shown in FIG. 1) and controlled by MCU 130 in a conventional manner. The mobile terminal 100 further comprises a number of conventional functional blocks, e.g. clock, display, keyboard, audio circuitry such as loudspeaker and microphone, etc, and a SIM-card, communicatively coupled with the MCU 130, not illustrated in FIG. 1 for the sake of clarity. Flash memory 110 may be realised as a NOR-flash-memory, providing XIP-functionality (execute In Place), or as a NAND-flash-memory, currently lacking the XIP-feature. The flash memory 110 and the (optional) RAM memory 120 is interconnected with MCU 130 by conventional control-, data- and address-busses 121 and 111, enabling the MCU/CPU 130 to fetch/store data from/to the memories 110, 120 in a conventional manner. A ROM 150 may be a conventional (BIOS) ROM-memory 150 communicatively coupled with MCU/CPU 130, with stored program code means for booting the MCU/CPU 130. However one advantage of the invention is that the flash memory 110 can replace both the conventional RAM 120 and the conventional BIOS ROM 150 in a mobile radio terminal without sacrificing any substantial data security, as described further below.

Figure 2A:
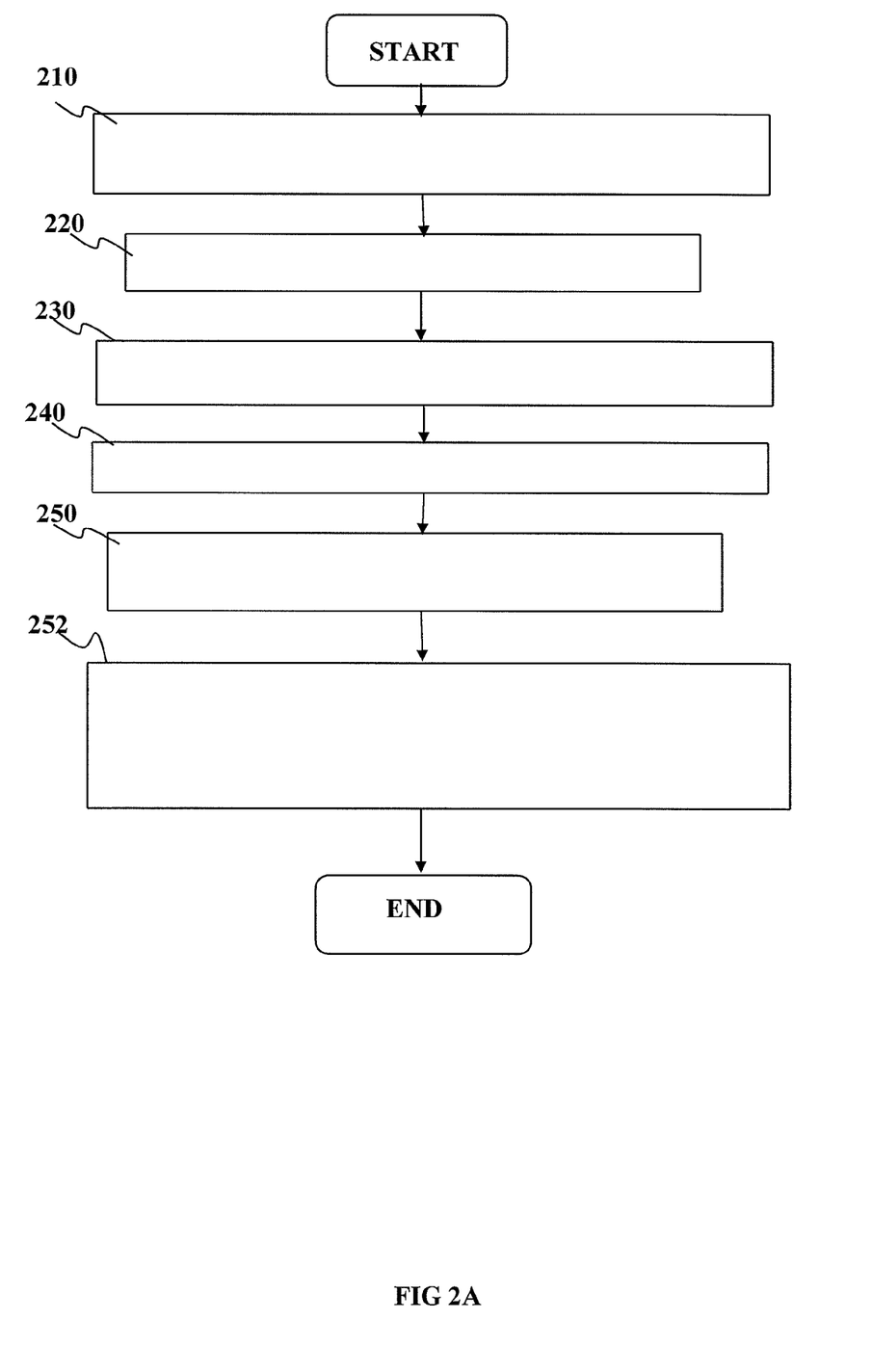
FIGS. 2A and 2B show a flow chart diagram illustrating the method according to the invention.

FIG. 2A is a flowchart diagram illustrating the method according to the invention for writing digital certificates and a computer program associated with the certificates and a certificate slot address pointer into a flash. The method illustrated in FIG. 2A is typically carried out during the production of a mobile radio terminal 100. The steps 200-252 are normally carried out by a computer program creating a mirrored flash data version which is first stored on a disc and then stored in the flash, when storing the first program version of the mobile radio terminal 100 at production or whenever updating the program/s of the mobile radio terminal 100.

In step 210, a flash is provided, e.g. by installing a conventional flash 110 in the mobile radio terminal 100 and coupling it with the CPU/MCU 130 in a conventional manner.

In step 220, at least one of said erase-write blocks is first unlocked by means of a conventional "unlock block"-hardware command and thereafter erased, in a conventional manner by means of a "erase block"-hardware command, setting all cell bits of said block to binary "1". In a preferred embodiment, said erase-write block is the block which is first addressed when the flash is being powered on, i.e. block 0 in table 1 below which is the block from which the CPU 130 starts to fetch data as soon as the mobile radio terminal 100 is powered on. This helps to minimise the security attack exposure time for the flash and is thus advantageous.

In step 230, a plurality of memory slots are defined within said erased erase-write block wherein, according to the invention, each memory slot commences at a memory address comprising a binary "00"- or a binary "11" bit pattern, thus allowing a simple and efficient address slot pointer update as described further below. The term "bit pattern" shall here be interpreted as being a "binary bit pattern", if not otherwise stated.

In step 240, a first digital certificate A is written in a first one of said memory slots and a second digital certificate B is written in a second one of said memory slots by means of a conventional "write block"-hardware command, thereby setting some cell data bits to "0" in said slots. The certificates A and B may be certificates associated with arbitrary application programs, and certificate B represents an updated version of certificate A. Thus, certificate B has thus a higher revision number than certificate A. Alternatively, the validity time of certificate B expires after the validity time of certificate A. In a preferred embodiment, the certificates A and B are associated with a booting program for booting up the CPU 130, giving advantages as described further below. This means that the validity of certificates A and B is verified by the verification program in order to establish that the booting program is authentic and has not been tampered with. According to the invention, any additional certificate besides certificate A, such as certificate B, C and D in the illustrative example illustrated in table 1 below, is written in a dedicated slot, the commencing address of which constitutes an updated version of the commencing address of the "previous" certificate, by replacing a "00"- or "11"-bit pattern of the commencing address of the "previous" certificate (certificate with lower revision number) with a "11"- or a "00"-bit pattern for the "next" certificate (certificate with higher revision number), respectively. Table 1 illustrates the case wherein a 11-bit pattern of the previous certificate commencing address is replaced by a "00"-bit pattern for the commencing address of the next certificate.

Figure 3A:
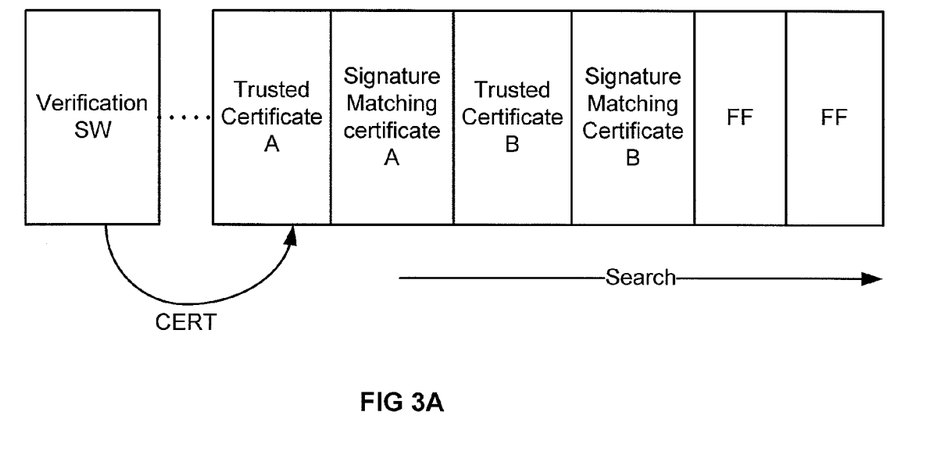
FIG. 3A illustrates how digital certificates and digital signatures are stored in a flash memory according to one embodiment of the invention.
Figure 3B:
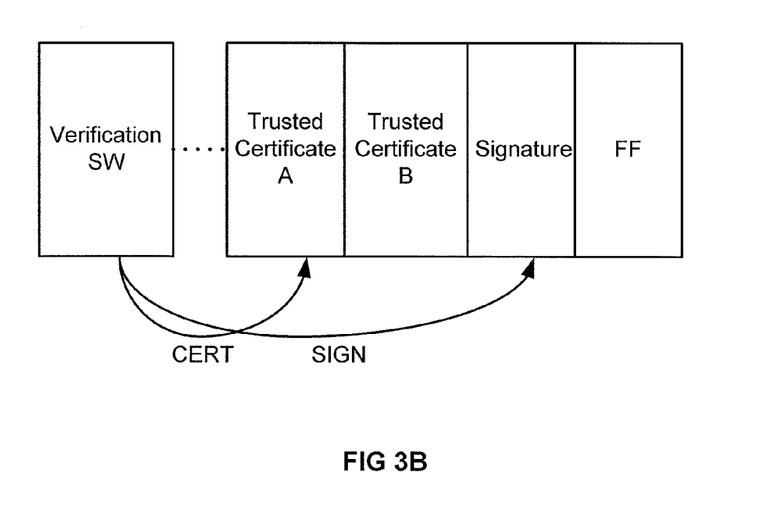
FIG. 3B illustrates how digital certificates and digital signatures are stored in a flash memory according to one embodiment of the invention.

Furthermore, in step 240, one digital signature verifying the computer program, signature A, B, C and D in table 1, for each and all of the certificates A, B, C and D respectively, is stored in the flash. The signature A data string is calculated in a conventional manner by first calculating a hash value for the entire program code associated with signature/certificate A along with all certificates A-D, and thereafter encrypt said hash value with the private key of certificate A. The further signatures B, C, D etc. are calculated in a corresponding manner. In one embodiment of the invention, the signatures A, B, C and D are stored in the same block as the certificates providing efficient memory utilisation. In one embodiment of the invention, the signatures A, B, C and D are stored in the same slot as the certificates A, B, C and D respectively, as illustrated in table 1 and FIG. 3A, providing an even more efficient memory utilisation. In one embodiment of the invention, the certificates A, B, C and D comprise the signatures A, B, C and D respectively. Thus, in this embodiment, each certificate comprises two signatures, i.e. one "conventional" signature verifying the certificate itself and one signature verifying the computer program. Alternatively, the certificates A, B etc. may comprise a linking address to their respective computer program signature, A, B etc. which may be advantageous when using rather small slot sizes, e.g. defined as single pages or set of pages, wherein a single slot may not comprise both a certificate and a computer program signature. In one embodiment the computer signatures A, B, C, D etc are stored in dedicated slots, as illustrated by FIG. 3B. In this embodiment, the relevant certificate may comprise a linking address to the signature in question or, alternatively, a signature address pointer may be defined and used by the verification software in the same manner as described below for the certificate slot address pointer for addressing the certificates. FIG. 3B illustrates this embodiment wherein digital certificates/signatures are written in dedicated slots and a certificate slot address pointer and a signature slot address pointer are used by the verification software. This embodiment provides flexibility regarding memory utilisation. It shall be understood that, in case of using rather small slot sizes, one certificate may be divided in several parts and written/stored in a set of slots, wherein a certificate's first part is stored in a first slot and comprises a linking address to the slot in which it's second part is being stored and so on. Furthermore, in case of very small slot sizes, a slot may comprise only the linking address to the certificate in question. Therefore, the term "certificate" shall here be interpreted to also mean only a part of a certificate along with a linking address to a certificate or simply an address link linking to a certificate.

In step 250, a certificate slot address pointer to be used by the verification software program for verifying the validity of the certificates A and B is defined. The certificate slot address pointer indicates the commencing address of a currently valid certificate slot and is exploited by the verification program to fetch and read said currently valid certificate. Initially, after having written the certificates into the flash, this certificate slot address pointer is defined as being the commencing address of the first valid certificate, i.e. certificate A in the illustrative example above, i.e. address 0x01FC00 in the example illustrated by table 1, below. In a preferred embodiment, the certificate slot address pointer is stored in the flash, and even more preferably, within the same block as the certificates, as illustrated by table 1. This provides for efficient memory utilisation allowing a replacement of a plurality of conventional memory entities, such as RAMs and/or ROMs, by a single flash. In this preferred embodiment, said certificate slot address pointer is updated by replacing a "11"-bit pattern of said pointer with a "00" bit pattern, since the flash memory can only be updated by replacing 1-bits with 0-bits. This makes it possible to never erase the pre-stored certificates, thus saving (decreasing) precious "security attack time" and updating the certificates, referred to as certificate roll over, by simply updating the certificate slot address pointer so as to point on the commencing address of the next, and currently valid, certificate. Exploiting simply the certificate slot address pointer means that the flash memory is exposed for security attacks during a drastically decreased period of time in comparison with state of the art techniques, as described further below. In the preferred embodiment wherein the certificate slot address pointer is stored in the flash, the validity time period, i.e. "best before date" or revision nr, decreases with increasing slot entrance address (number), as illustrated in table 1. Alternatively, if the slot pointer is stored for instance in a battery back up powered RAM, the certificate slot address pointer may be updated by replacing a "00"-bit pattern of the certificate slot pointer with a "11"-bit pattern instead, and the order of the certificates A-D in table 1 are reversed. In case the computer program associated with the certificates is a booting program, the invention makes it possible to substitute BIOS ROMs with BIOS (Basic Input Output System) flash memories by storing the booting program in the flash. Thus, the invention makes it possible to replace a BIOS ROM of an apparatus with a cheaper and more flexible flash without a substantial sacrifice of data security. For instance, the mobile radio terminal 100 illustrated in FIG. 1 is such an apparatus. However, the computer program may be any mobile radio terminal application software and preferable, the certificates are used for verifying both the booting program and a mobile radio terminal application program. In this case, above hash values may be calculated on data comprising both the booting program and application program, but many possibilities exist.

In step 252, in order to provide an efficient memory utilisation, the verification software, certificate slot address pointer and the computer program associated with the certificates are all written in the flash, according to one embodiment of the invention. However, as already stated, neither the certificate slot address pointer nor the computer program associated with the certificates need necessarily be written into the flash. In a preferred embodiment, the verification software, certificate slot address pointer, certificates and the computer program associated with the certificates are all written in the same flash block, preferably in the block being first addressed when the flash is powered on, as already stated. In case of a NAND flash, the verification software, certificate slot address pointer and certificates may be stored within one flash block, and one certificate is stored in a respective page or in a respective set of pages forming the slots. This provides for efficient memory utilisation.

Table 1 illustrates an example of the memory area layout for a flash according to the invention wherein all blocks have initially been erased and a first certificate A along with its associated computer program signature A has been written in a first slot and a second certificate B along with its associated program signature B has been written in a second slot, a third certificate C along with its associated program signature C has been written in a third slot and a fourth certificate D along with its associated program signature D has been written in a fourth slot. Thus, table 1 illustrates how the flash memory layout may look like after step 252. Each slot has a size of 1024 bytes and the respective signature is stored 512 bytes after its respective certificate, in table 1. In case of a NAND flash, 2 pages may form a single slot of 1024 bytes wherein 1 page is used for storing a respective certificate and 1 page is used for storing a respective signature, as illustrated in table 1. However, one slot may be formed by a plurality of pages, e.g. 4, 8 etc. pages, in case the size of the certificates/signatures so requires.

| Address | Block nr | Page nr | Slot | Rev. nr | Data |
|---|---|---|---|---|---|
| 0x00x000 | 0 | 0 | | | Booting program comprising verification program |
| | 0 | | | | |
| 0x00FE00 | 0 | 127 | | | Certificate slot address pointer |
| 0x010000 | 0 | 128 | 4 | 52 | Certificate D |
| 0x010200 | 0 | 129 | 4 | 52 | Signature D |
| ... | 0 | | | | FF |
| 0x01C000 | 0 | 224 | 3 | 51 | Certificate C |
| 0x01C200 | 0 | 225 | 3 | 51 | Signature C |
| ... | 0 | | | | FF |
| 0x01F000 | 0 | 248 | 2 | 50 | Certificate B |
| 0x01F200 | 0 | 249 | 2 | 50 | Signature B |
| ... | 0 | | | | |
| 0x01FC00 | 0 | 254 | 1 | 49 | Certificate A |
| 0x01FE00 | 0 | 255 | 1 | 49 | Signature A |
| ... | 0 | | | | |
| 0x01FFFF | 0 | | | | |
| 0x020000 | 1 | | | | Mobile radio terminal application software |
| 0x03FFFF | 1 | | | | |
| 0x040000 | 2 | | | | |

After step 252, the mobile radio terminal is ready for use.

Figure 2B:
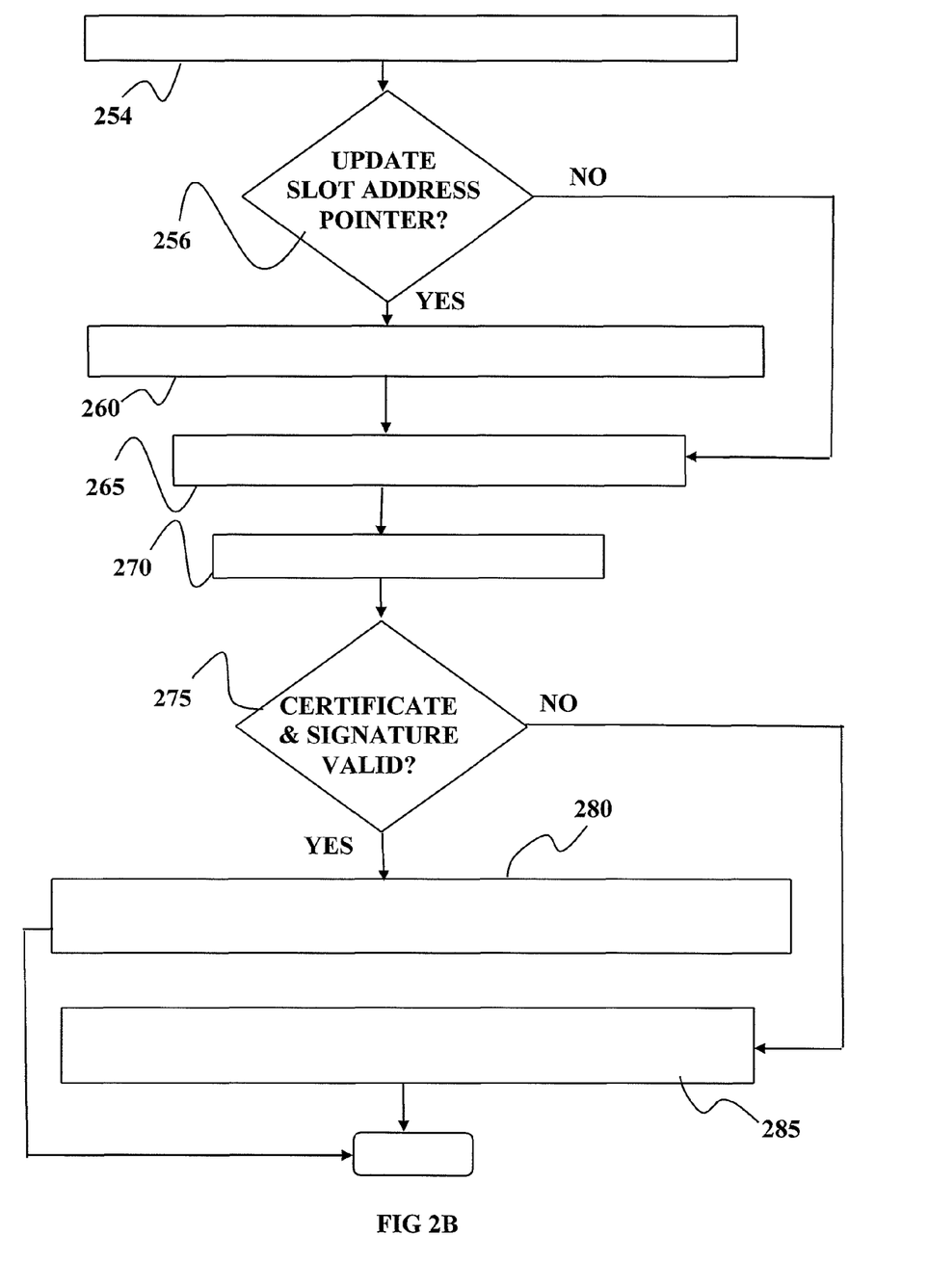

Now, referring to FIG. 2B, the mobile radio terminal 100 is powered on in step 254 triggering the computer program associated with the certificate/s to be launched/executed. As already stated, in a preferred embodiment said computer program associated with the certificates is a Booting program for booting up the CPU/MCU 130 and the Booting program execution is initiated automatically whenever the flash 110 and CPU/MCU 130 is powered on. This means that the flash 110 forms a BIOS for the CPU/MCU 130. In order to minimise the security attack exposure time, it is thus advantageous to store the booting program, verification program, certificates and signatures in the block of the flash which is first being addressed at power on, thereby saving "search and addressing time". For the same reason, it is advantageous that the booting program comprises the verification program and that the verification program is being addressed first, i.e. immediately, at power on. This means that the verification program is stored at the address of the flash which is first addressed when the flash is powered on. Thus, in step 254, the verification program starts to being executed.

In step 256, the verification software checks whether the certificate slot address pointer must be updated or not. This check may be carried out in many different ways. For instance, the updating of the certificate slot address pointer may be carried out regularly, i.e. being controlled by a predefined updating time scheme of the verification software or the verification software may check a revision nr, or "best before date" stored with the certificate, and only update the certificate slot pointer when said best before date or revision nr, when compared with corresponding pre-stored data within the verification program, does not match said corresponding pre-stored data. These procedures require that the verification program has access to current time data, i.e. year, month, day, hour, etc., i.e. the updating of the certificate slot address pointer is controlled by an internal clock in the mobile radio terminal.

In a preferred embodiment, the verification program checks whether the certificate slot address pointer is to be updated or not in step 256 by carrying out the following steps:

1. checking whether there is an updating message with an updating message signature assigned to the verification program. This check may be carried out by having the verification program to search for data at an address dedicated for the updating message and letting the verification program fetch this updating message/signature and thereafter erase the block wherein this updating message/signature is stored. The updating message along with the updating message signature may be stored on a dedicated address in a suitable memory of the mobile radio terminal, e.g. in the configuration file system of the mobile radio terminal 100. This updating message along with the updating message signature slot may be introduced in the mobile radio terminal in different ways, i.e. by means of an SMS-message, or storing said updating message, in form of a signed data object, in the flash during software upgrade at "customer service" etc. It is known how to store a signed data object in the flash at customer service. What is important according to the invention is that, at a certain point, the verification program establish whether there is a signed updating message or not assigned for the verification program, which updating message was not present in the mobile radio terminal 100 the last time the mobile radio terminal 100 was powered on, and that said updating message instructs the verification program, during run-time, to carry out certificate roll over. In case this updating message states that the current valid certificate is certificate B, a hash of the updating message is encrypted with the private key of certificate B, forming the signature of the updating message. This updating message may comprise a new certificate to be stored in a slot.

2. In case the verification program finds said updating message assigned to the verification program, or the verification program's updating time scheme states that a certificate roll over is to be carried out, the method proceeds to step 260, and in case it shall not be updated, i.e. the verification program does not find said updating message or the verification program's updating time scheme states that a certificate roll over is not to be carried out, the method proceeds directly to step 265.

In step 260 the certificate slot address pointer is updated. This can be carried out by simply replacing a "11"-bit pattern of said certificate slot address pointer with a "00"-bit pattern according to a pre-stored scheme known to the verification software. This procedure may be advantageous in the case of having a number of (fix) pre-installed certificates in the flash and simply performing certificate roll over at regular intervals. In case the verification program did find an updating message in step 256, the step of updating the certificate slot address pointer may comprise the following steps:

1. the verification program fetches the first certificate, i.e. certificate A,
2. the verification program calculates the hash value of the updating message (according to an algorithm known to the verification program), giving a calculated updating-message-hash,
3. the verification program decrypts the signature of the updating message exploiting the public key of certificate A, forming a decrypted updating-message-hash,
4. the verification program checks if the calculated updating-message-hash matches the decrypted updated-message-hash, if they match the certificate slot address pointer is updated accordingly, if they don't match, the verification program repeats the procedure for the next certificate, i.e. for certificate B in this case.

The steps 1-4 are repeated until a matching certificate has been found, which thus is the current valid certificate. In an alternative embodiment, the verification program may find the current valid certificate by performing a search in the flash, as described further below with reference to FIG. 4.

In step 260, the certificate slot address pointer is updated accordingly by setting it to equal the commencing address of the current valid certificate. In case the certificate slot address pointer is stored in the flash, this is carried out by means of a conventional flash hardware "write"-command.

In step 265, the flash is protected from being written by means of a conventional hardware "lock down"- or "lock tight"-command. After having protected the flash from being written, the flash is locked and protected from external security attacks. It is thus advantageous that the step 265 is carried out at as an early stage as possible, thus decreasing the "tampering time window" and enhancing the tampering proof characteristics of the flash. Therefore, in a preferred embodiment, step 265 is carried out immediately after step 260.

The method proceeds to step 270 from step 265. In step 270, the verification software fetches the relevant certificate, the current valid certificate, the commencing storing address of which is now indicated by the certificate slot address pointer. The signature associated with the computer program is also fetched in this step, which is normally comprised within the certificate. For instance, in an illustrative example wherein said updating message was signed by exploiting the private key of certificate B, the verification software fetches certificate B and signature B, illustrated in table 1, in step 270.

In step 275, the verification software checks the validity of the fetched certificate and the signature in a conventional manner. For instance, in an illustrative example, the signature B is a hash of the entire computer program along with all the certificates which hash has been encrypted with the private key of certificate B. The verification program calculates the hash of the entire program and all the certificates (according to known algorithm) and decrypts the signature B exploiting the pubic key of certificate B (stored in certificate B). Certificate B (and signature B) is valid if the decrypted hash matches the calculated hash, otherwise the certificate B is not valid. If the certificate is valid, the method proceeds to step 280, and if the certificate is not valid, the method proceeds to step 285.

In step 280, the execution of the computer program associated with the certificates continues until it is completed, and the method then stops. In case the computer program is a booting program, the CPU/MCU 130 is thus now booted, i.e. being loaded with relevant operation system program etc.

In step 285, the execution of the computer program associated with the certificates is stopped, and the method then stops.

Figure 4:
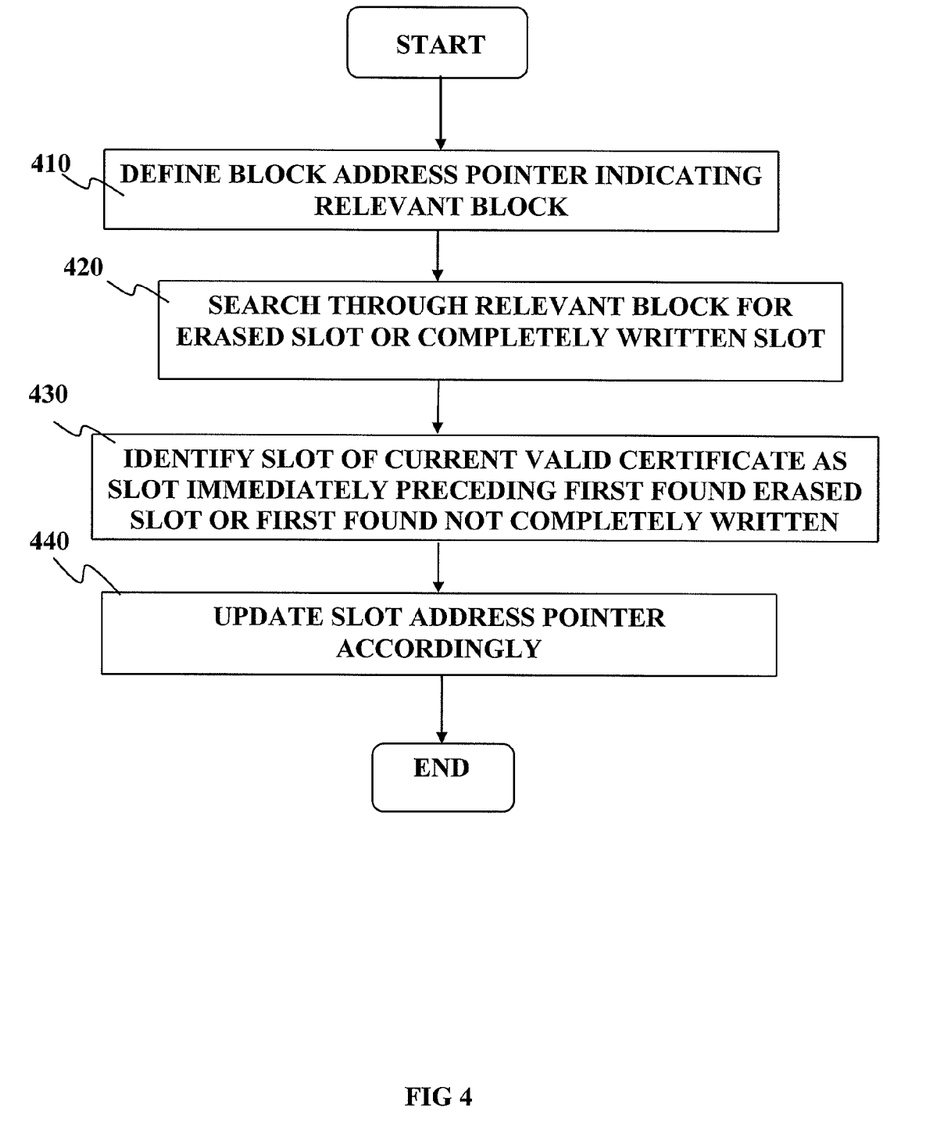
FIG. 4 is a flow chart diagram illustrating how the certificate slot address pointer is updated according to one embodiment of the invention.

Now, with reference to FIG. 4, the method of updating the certificate slot address pointer according to one embodiment comprises the steps illustrated in FIG. 4. In step 410, in which a block address pointer pointing to the relevant erased erase-write block, e.g. the address of the block being first addressed at power on, is defined. In step 420, the verification program searches through said erased erase-write block for an erased slot by means of a sequential address search, initiating at an address indicated by said block address pointer. In this embodiment, the current valid certificate is the last certificate that has been stored in the flash, e.g. certificate C in table 1 under the assumption that there is no certificate D written in the flash and that the slot of certificate D in table 1 is erased and never written, i.e. the slot of certificate D comprises only "1"-bits and only certificate A, B and C are stored in the flash. As soon as an erased slot is found, i.e. a slot filled only with "1"-bits, the search is stopped. In the illustrative example of table 1 wherein certificate D has not been written into the flash, the slot commencing at 0x010000 is thus such an erased slot and the verification program will stop as soon as this slot has been detected. This first found erased slot is normally the certificate slot having the highest address entrance of all non written certificate slots within said block wherein non written slots are slots filled only with "1"-bits.

In step 430, the slot of the current valid certificate is identified to be the slot immediately preceding said found erased slot found during said search, i.e. the slot of certificate C in the illustrative example above.

In step 440, the certificate slot address pointer is updated with the commencing slot address of the identified slot of the current valid certificate, i.e. with the commencing address 0x01C000 of the slot of certificate C in this illustrative example.

Other searching procedures/criteria may be used by the verification program to find the current valid certificate, e.g. a search for "completely written" and non "completely written" certificate slots wherein the first found non completely written certificate slot is established to be the slot of the current valid certificate. In this case, whenever a new current valid certificate is written into the flash, i.e. by means of the updating message as explained above, the previously current valid certificate is completely overwritten by setting all bits to "0" in the slot of the previously valid certificate. Thus, instead of searching for erased slot/s, a search for completely "overwritten" slots, i.e. slots only comprising "0"-bits, is carried out. This is also illustrated in FIG. 4.

The principles of the present invention have been described in the foregoing by examples of embodiments or modes/examples of operations for the case of a certification storing/updating scheme used for a flash memory in a mobile radio terminal. However, as already stated, the invention is applicable for any flash memory and any electronic equipment comprising a CPU and a flash exploiting digital certificates for verifying program code/s. Furthermore, the illustrative example described above is particularly adapted to so called MLC-flashes, wherein a block is updated by replacing (at least) a "11"-bit pattern with a "00"-bit pattern, however the invention may be realised by replacing a "1" bit- or "0"-bit of the certificate slot address pointer's address with a "0" bit or "1" bit, respectively, as a person skilled in the art realises. The number of "1"-bits, or alternatively "0"-bits, being replaced for updating the certificate slot address pointer, i.e. for carrying out certificate roll over, generally depends on where in the address space of the flash the certificates are stored and the size of the certificates, as a person skilled in the art realises. For instance, referring back to the illustrative example illustrated in table 1 wherein certificate A is stored on the address 0x01FC00, certificate B may be stored on address 0x1F800 instead of on address 0x01F000, and the certificate slot address pointer is in this case updated by replacing one "1" bit of the certificate slot address pointer with a "0" bit, for performing certificate roll over from certificate A to certificate B. Therefore, the invention should not be construed as being limited to the particular embodiments/working examples discussed above, and it should be appreciated that variations may be made in those embodiments/working examples by persons skilled in the art, without departing from the scope of the present invention as defined by the appended claims.

What is claimed is:

1. A method for writing and updating digital certificates in flash memory to enhance tampering proof characteristics of the memory comprising the steps of:
    erasing at least one erase-write block of a flash memory that has predefined erase-write blocks and write-read blocks,
    defining a plurality of memory slots within said at least one erased erase-write block wherein each memory slot has a commencing address comprising a binary "0"- or a binary "1" bit pattern,
    writing a first digital certificate in a first one of said memory slots and writing a second digital certificate in a second one of said memory slots,
    defining a certificate slot address pointer as being the commencing address of said first memory slot; said slot address pointer to be used by a verification program to fetch a current valid certificate; and
    updating said certificate slot address pointer when the first digital certificate expires by replacing said "0"- or "1"- bit pattern of said pointer with a "1"- or a "0" bit pattern, respectively, causing the address pointer to point on the commencing address of said second memory slot when the first digital certificate expires to minimize a period of time during which the memory is exposed to security attack during digital certificate update; and
    wherein the certificates authenticate a computer program when verified by the verification program that is associated with the computer program.

2. The method according to claim 1 further comprising the steps of:
    writing said certificate slot address pointer in a dedicated slot in said at least one of said erase-write blocks, and
    updating the certificate slot address pointer by replacing a "1"-bit pattern of the address pointer with a "0"-bit pattern.

3. The method according to claim 1 wherein said at least one of said erase-write blocks comprising said slots is the block which is first addressed when the flash memory is being powered on.

4. The method according to claim 3 wherein said computer program is a booting program booting up a processing means being coupled with said flash memory, when said flash memory and processing means are powered on, the method further comprising the step of:
    storing the booting program in the block which is first addressed when the flash memory and the processing means are being powered on.

5. The method according to claim 4 wherein the booting program comprises said verification program and said verification program is stored at an address which is first addressed when the flash memory is powered on.

6. The method according to claim 5 wherein said verification program comprises code means for updating said certificate slot address pointer and comprises write locking code means locking said flash memory from being written, said method further comprising the step of:
    storing said write locking code means in said flash memory so that the flash memory is being locked from being written immediately after said certificate slot address pointer is being updated.

7. The method according to claim 2 wherein said flash memory is an MLC flash memory and wherein the step of updating the certificate slot address pointer comprises the step of:
    replacing a "11"-bit pattern of the address pointer with a "00"-bit pattern.

8. The method according to claim 1 wherein said second digital certificate represents an updated version of said first digital certificate and, at a certain time, replaces said first digital certificate or an updated version of the first certificate.

9. The method according to claim 8 wherein said certificates are preinstalled and the step of updating the certificate slot address pointer is carried out periodically by said verification program or by said verification program in response to a lapsed validity time limit as indicated by the first certificate, or as indicated by an updated version of the first certificate.

10. The method according to claim 8 wherein the step of updating the certificate slot address pointer comprises the steps of:
    defining a block address pointer pointing to the end address of said at least one erased erase-write block in which said certificates are being written,
    searching through said erase-write block for erased and non written slots comprising only "1"-bits, or for completely written slots only comprising "0"-bits, by means of a sequential address search initiating at an address indicated by said block address pointer, identifying the slot of a current valid certificate as being the slot immediately preceding an erased and non written slot being found first during said search, or as being the first found slot during said search which slot does not comprise only "0"-bits, and updating said certificate slot address pointer with the commencing slot address of said identified slot of the current valid certificate.

11. The method according to claim 1 wherein said flash memory is a NAND flash memory having pages with a size of 2×256 bytes, the method further comprising the following step:

defining each memory slot as being one page or a set of pages.

12. A flash memory, comprising predefined erase-write blocks and write-read blocks and in which flash memory at least a first and second digital certificate are stored, the first and second certificates for authenticating a computer program when verified by a verification program, said second digital certificate representing an updated version of said first digital certificate, wherein:

said certificates are stored respectively in a first memory slot and a second memory slot defined within one of the erase-write blocks, and a certificate slot address pointer is stored in the flash memory, the certificate slot address pointer points to the slot in which a current valid certificate for the computer program is stored and is changed from the first slot storing the first digital certificate to the second slot storing the second digital certificate when the first digital certificate expires to minimize a period of time during which the memory is exposed to security attack during digital certificate update.

13. The flash memory according to claim 12 wherein said certificate slot address pointer is being stored in a dedicated slot in said erase-write block in which said certificates are being stored.

14. The flash memory according to claim 12 wherein said memory slots are defined within the erase-write block which is first addressed when the flash memory is being powered on.

15. The flash memory according to claim 14 wherein said computer program is a booting program booting up a processing means when coupled with said flash memory and when said flash memory and processing means are powered on, wherein the booting program is stored in the flash block which is first addressed when the flash memory is being powered on.

16. The flash memory according to claim 15 wherein the booting program comprises said verification program and said verification program is stored at the address which is first addressed when the flash memory is powered on.

17. The flash memory according to claim 16 wherein said verification program comprises code means for updating said certificate slot address pointer by replacing a "1"-bit pattern with a "0"-bit pattern of the certificate slot address pointer or by replacing a "11"-bit pattern with a "00"-bit pattern of the certificate slot address pointer, and further comprises write locking code means locking said flash memory from being written, wherein said write locking means are being stored in said flash memory so that, when said verification program is being executed, the flash memory is being locked from being written immediately after said certificate slot address pointer is being updated.

18. The flash memory according to claim 12 wherein said flash memory is an MLC flash memory and wherein the certificate slot address pointer comprises a "11"-bit pattern or a "00"-bit pattern.

19. The flash memory according to claim 12 wherein said certificates are preinstalled and wherein said verification program comprises code means which, when said verification program is being executed, periodically updates said certificate slot address pointer in response to a lapsed validity time limit as indicated by the first certificate, or as indicated by an updated version of the first certificate.

20. The flash memory according to claim 12 wherein the verification program comprises program code means for carrying out the following steps:

defining a block address pointer pointing to the end address of said at least one erased erase-write block in which said certificates are being written, searching through said erase-write block for erased and non written slots comprising only "1"-bits, or for completely written slots only comprising "0"-bits, by means of a sequential address search initiating at an address indicated by said block address pointer, identifying the slot of a current valid certificate as being the slot immediately preceding an erased and non written slot being found first during said search, or as being the first found slot during said search which slot does not comprise only "0"-bits, respectively, and updating said certificate slot address pointer with the commencing slot address of said identified slot of the current valid certificate.

21. The flash memory according to claim 12 wherein said flash memory is a NAND flash memory having pages with a size of 2×256 bytes, and wherein each memory slot is defined as being one page or a set of pages.

22. An electronic apparatus comprising a processing unit communicatively coupled with a flash memory, wherein the flash memory is a flash memory according to claim 12.

23. The electronic apparatus according to claim 22 wherein said apparatus is a mobile radio terminal.

* * * * *